US012792396B1

(12) United States Patent
Shekel et al.

(10) Patent No.: US 12,792,396 B1
(45) Date of Patent: Nov. 10, 2026

(54) COMPILATION PROCESS FOR DECENTRALIZED SCHEDULING OF COMPUTE GRAPHS ON HETERO PLATFORMS

(71) Applicant: NeuReality Ltd., Caesarea (IL)

(72) Inventors: Yuval Shekel, Raanana (IL); Alex Shpiner, Ramat Yishai (IL); Yariv Aridor, Zichron-Yaakov (IL)

(73) Assignee: NeuReality Ltd., Caesarea (IL)

( * ) Notice: Subject to any disclaimer, the term of this patent is extended or adjusted under 35 U.S.C. 154(b) by 740 days.

(21) Appl. No.: 18/318,298

(22) Filed: May 16, 2023

Related U.S. Application Data

(60) Provisional application No. 63/364,836, filed on May 17, 2022.

(51) Int. Cl.

| | |
|---|---|
| ***G06F 9/50*** | (2006.01) |
| ***G06F 9/45*** | (2006.01) |
| ***G06F 9/48*** | (2006.01) |
| ***G06F 17/30*** | (2006.01) |
| ***G06N 20/00*** | (2019.01) |

(52) U.S. Cl.
CPC ...... *G06F 9/4881* (2013.01); *G06F 2209/486* (2013.01)

(58) Field of Classification Search
CPC .... G06F 9/4881; G06F 2209/486; G06F 9/52; G06F 9/5066; G06F 9/5038; G06F 9/445; G06F 8/34; G06F 8/35; G06F 8/60; G06F 9/544; G06F 9/3856; G06F 9/5027; G06F 8/456; G06F 8/71; G06F 8/24; G06F 8/36; G06F 8/433; G06F 16/9024; G06N 20/00; H04L 67/62; H04L 67/125
See application file for complete search history.

(56) References Cited

U.S. PATENT DOCUMENTS

| | | | | |
|---|---|---|---|---|
| 5,203,003 | A | 4/1993 | Donner | |
| 5,890,207 | A | 3/1999 | Sne et al. | |
| 7,564,585 | B2 | 7/2009 | Berkner et al. | |
| 7,590,964 | B1 | 9/2009 | Petkov et al. | |
| 9,378,044 | B1 | 6/2016 | Gaurav et al. | |
| 9,588,852 | B2 | 3/2017 | Barak et al. | |
| 9,778,961 | B2 * | 10/2017 | Raman .................. | G06F 9/5066 |

(Continued)

OTHER PUBLICATIONS

Ott et al., Graph-based Task Scheduling on Heterogeneous Resources, 34 pages (Year: 2024).*

(Continued)

*Primary Examiner* — Thuy Dao
(74) *Attorney, Agent, or Firm* — M&B IP Analysts, LLC

(57) ABSTRACT

Methods and systems for decentralized scheduling of compute graphs on heterogenous are provided. The methods include compiling a source compute graph into a low-level control graph, wherein a source compute graph represents a set of compute functions that be performed on compute engines embedded in the heterogenous platform, and wherein the low-level control graph includes compute nodes and control nodes; and causing provisioning of the low-level control graph for execution on compute engines and job processing units (JPUs), wherein the low-level control graph determines a schedule of execution of the set of compute functions, wherein a control node in the low-level control graph schedules a next compute node to execute a compute function.

22 Claims, 10 Drawing Sheets

200

(56) References Cited

U.S. PATENT DOCUMENTS

| | | | |
|---|---|---|---|
| 9,817,668 | B2 | 11/2017 | Fetterman et al. |
| 10,296,327 | B2 | 5/2019 | Govindaraju et al. |
| 10,942,767 | B2 | 3/2021 | Chandra et al. |
| 11,487,585 | B1 | 11/2022 | Gilliland et al. |
| 12,190,149 | B2 * | 1/2025 | Nakamura ............. G06Q 10/06 |
| 12,430,166 | B2 * | 9/2025 | Miniskar ............... G06F 9/5016 |
| 2003/0028656 | A1 | 2/2003 | Babka |
| 2011/0023029 | A1 | 1/2011 | Diab et al. |
| 2011/0131580 | A1 | 6/2011 | Krishnamurthy et al. |
| 2011/0239203 | A1 | 9/2011 | Sukumaran et al. |
| 2012/0222043 | A1 | 8/2012 | Gounares et al. |
| 2013/0231495 | A1 | 9/2013 | Leitner et al. |
| 2013/0346993 | A1 | 12/2013 | Chen et al. |
| 2014/0115594 | A1 | 4/2014 | Hankins et al. |
| 2014/0245313 | A1 | 8/2014 | Otenko |
| 2015/0355948 | A1 | 12/2015 | Bass et al. |
| 2015/0379072 | A1 | 12/2015 | Dirac et al. |
| 2017/0123861 | A1 | 5/2017 | Otenko |
| 2017/0220499 | A1 | 8/2017 | Gray |
| 2018/0150299 | A1 | 5/2018 | Balle et al. |
| 2018/0302277 | A1 | 10/2018 | Shimamura et al. |
| 2018/0307971 | A1 | 10/2018 | Sinha et al. |
| 2019/0042308 | A1 | 2/2019 | Kumar et al. |
| 2019/0050715 | A1 | 2/2019 | Ooi et al. |
| 2019/0139182 | A1 | 5/2019 | Nurvitadhi et al. |
| 2019/0205736 | A1 | 7/2019 | Bleiweiss et al. |
| 2019/0205737 | A1 | 7/2019 | Bleiweiss et al. |
| 2019/0205745 | A1 | 7/2019 | Sridharan et al. |
| 2019/0317802 | A1 | 10/2019 | Bachmutsky et al. |
| 2020/0249996 | A1 | 8/2020 | Kumar Addepalli et al. |
| 2020/0311569 | A1 | 10/2020 | Ghosh |
| 2021/0004668 | A1 | 1/2021 | Moshovos et al. |
| 2021/0073170 | A1 | 3/2021 | Liao et al. |
| 2021/0117246 | A1 | 4/2021 | Lal et al. |
| 2021/0264257 | A1 | 8/2021 | Hu et al. |
| 2022/0066409 | A1 | 3/2022 | Soler Garrido et al. |
| 2022/0269548 | A1 | 8/2022 | Dwivedi et al. |
| 2023/0096502 | A1 | 3/2023 | Tadkase et al. |
| 2023/0136048 | A1 | 5/2023 | Doshi et al. |
| 2024/0083448 | A1 | 3/2024 | Nemec et al. |

OTHER PUBLICATIONS

Zhang, et al. “TEESlice: Slicing DNN Models for Secure and Efficient Deployment”, AISTA ’22, Jul. 18, 2022, Virtual, South Korea. Association for Computing Machinery.

* cited by examiner

COMPILATION PROCESS FOR DECENTRALIZED SCHEDULING OF COMPUTE GRAPHS ON HETERO PLATFORMS

CROSS-REFERENCE TO RELATED APPLICATIONS

This application claims the benefit of U.S. Provisional Application No. 63/364,836 filed May 17, 2022, the contents of which are hereby incorporated by reference.

TECHNICAL FIELD

The disclosure generally relates to a method for decentralized scheduling of compute graphs on hetero platforms.

BACKGROUND

Current computing systems may use heterogeneous (hetero) platforms. The Hetero platform refers to a set of processing units or compute processors (collectively referred to as a compute engine or compute engines) of different types within a computing system. Hereinafter, a compute engine is a piece of hardware that can execute compute or AI function.

For instance, a computing system that includes two compute engines with a different number and/or types of cores and/or clock frequencies is often referred to as heterogeneous.

The hetero platforms may include multiple compute engines optimized for the acceleration of specific types of functions (e.g., image decoding) or computations (e.g., SIMD). The compute engines of a hetero platform can share data (often by connecting to a shared memory) and run multiple computations concurrently on the different compute engines.

An example of such a system can be a system with a host CPU, connected to one or more compute engines through a certain interface. The host executes the main application and off-loads compute graphs onto the compute engines. These graphs are then executed asynchronously from the application(s) running on the host.

A compute graph (e.g., a deep learning model) is a high-level representation of compute functions with data and control dependencies between them. Each compute function may exploit a different compute engine. Typically, offloading an entire compute graph onto a hetero platform includes the following steps: i) spawning every compute function for execution on a specific compute engine, and ii) maintaining the control and data dependencies as defined by the compute graph.

Such offloading of a compute graph is performed today with a centralized runtime component including graph scheduling to control and maintain the runtime execution state of a compute graph (e.g., which computations have already completed, and which computations can run next). This centralized graph scheduling is a bottleneck to performance. Moreover, centralized graph scheduling forces host/CPU-centric architecture of hetero platforms (hence centralized hetero platform). In such architectures, the host executes the centralized graph scheduling which may lead to execution bottleneck, and hence degradation in performance.

With the current centralized hetero platform SoC, the graph scheduling runs either on an external CPU (e.g., a hetero platform is connected to a host over PCIe) or inside the hetero platform's system on chip (SoC) which may be an internal microprocessor or CPU connected with the compute processors via a shared bus. With all platforms, the graph scheduler is a centralized component executed on that host with the above-mentioned drawbacks including performance bottleneck.

Specifically, every computation on a compute engine involves back and forth expensive communication with the graph scheduler to update the graph execution state of its completion, resolve dependencies, and spawn new independent computations on the compute engines. Conventionally, all these communications and multiple compute graphs running simultaneously on the hetero platform may be handled by the singleton scheduler component.

It would be, therefore, advantageous to provide decentralized scheduling of compute graphs on hetero platforms solution that would overcome the deficiencies mentioned above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for decentralized scheduling of compute graphs on heterogenous platforms. The method also includes compiling a source compute graph into a low-level control graph, where a source compute graph represents a set of compute functions that be performed on compute engines embedded in the heterogenous platform, and where the low-level control graph includes compute nodes and control nodes; and causing provisioning of the low-level control graph for execution on compute engines and job processing units (JPUs), where the low-level control graph determines a schedule of execution of the set of compute functions, where a control node in the low-level control graph schedules a next compute node to execute a compute function. Other embodiments of this aspect include corresponding computer systems, apparatus, and computer programs recorded on one or more computer storage devices, each configured to perform the actions of the methods.

One general embodiment includes a non-transitory computer readable medium having stored thereon instructions for causing a processing circuitry to execute a process. The non-transitory computer readable medium also includes compiling a source compute graph into a low-level control graph, where a source compute graph represents a set of compute functions that be performed on compute engines embedded in the heterogenous platform, and where the low-level control graph includes compute nodes and control nodes; and causing provisioning of the low-level control graph for execution on compute engines and job processing units (jpus), where the low-level control graph determines a schedule of execution of the set of compute functions, where a control node in the low-level control graph schedules a next compute node to execute a compute function. Other embodiments of this aspect include corresponding computer systems, apparatus, and computer programs recorded on one or more computer storage devices, each configured to perform the actions of the methods.

One general embodiment includes a compiler for decentralized scheduling of compute graphs on heterogenous platforms. The compiler also includes a processing circuitry. The compiler also includes a memory, the memory containing instructions that, when executed by the processing circuitry, configure the compiler to: compile a source compute graph into a low-level control graph, where a source compute graph represents a set of compute functions that be performed on compute engines embedded in the heterogenous platform, and where the low-level control graph includes compute nodes and control nodes; and cause provisioning of the low-level control graph for execution on compute engines and job processing units (JPUs), where the low-level control graph determines a schedule of execution of the set of compute functions, where a control node in the low-level control graph schedules a next compute node to execute a compute function. Other embodiments of this aspect include corresponding computer systems, apparatus, and computer programs recorded on one or more computer storage devices, each configured to perform the actions of the methods.

One general aspect includes a method for decentralized scheduling of compute graphs on heterogenous platforms. The method also includes receiving a low-level control graph compiled from a source compute graph, where the source compute graph represents a set of compute functions that be performed on compute engines embedded in the heterogenous platform, and where the low-level control graph includes compute nodes and control nodes; and provisioning of the low-level control graph for execution on compute engines and job processing units (JPUs), where the low-level control graph determines a schedule of execution of the set of compute functions, where a control node in the low-level control graph schedules a next compute node to execute a compute function. Other embodiments of this aspect include corresponding computer systems, apparatus, and computer programs recorded on one or more computer storage devices, each configured to perform the actions of the methods.

One general aspect includes a non-transitory computer readable medium having stored thereon instructions for causing a processing circuitry to execute a process. The non-transitory computer readable medium also includes receiving a low-level control graph compiled from a source compute graph, where the source compute graph represents a set of compute functions that be performed on compute engines embedded in the heterogenous platform, and where the low-level control graph includes compute nodes and control nodes; and provisioning of the low-level control graph for execution on compute engines and job processing units (JPUs), where the low-level control graph determines a schedule of execution of the set of compute functions, where a control node in the low-level control graph schedules a next compute node to execute a compute function. Other embodiments of this aspect include corresponding computer systems, apparatus, and computer programs recorded on one or more computer storage devices, each configured to perform the actions of the methods.

One general aspect includes an artificial intelligence (AI) for decentralized scheduling of compute graphs on heterogenous platforms. The artificial intelligence also includes a processing circuitry. The intelligence also includes a memory, the memory containing instructions that, when executed by the processing circuitry configure the processing circuitry to: compile a source compute graph into a low-level control graph, where a source compute graph represents a set of compute functions that be performed on compute engines embedded in the heterogenous platform, and where the low-level control graph includes compute nodes and control nodes; and cause provisioning of the low-level control graph for execution on compute engines and job processing units (JPUs), where the low-level control graph determines a schedule of execution of the set of compute functions, where a control node in the low-level control graph schedules a next compute node to execute a compute function. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
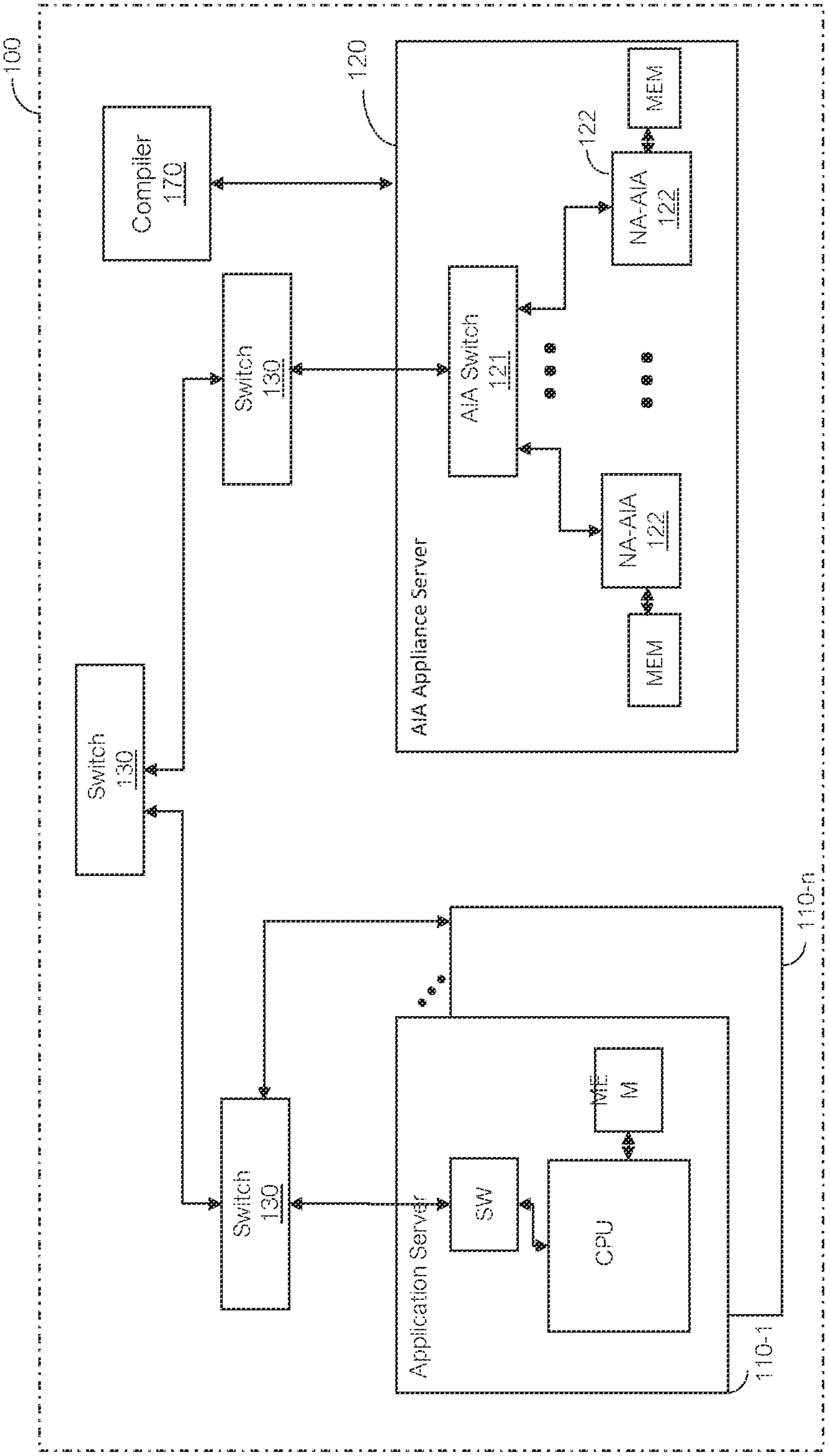
FIG. 1A is a diagram of an AI acceleration system utilized to describe the various disclosed embodiments.

The embodiments disclosed by the invention are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

The various disclosed embodiments allow for the decentralized scheduling of compute graphs on heterogenous (hetero) platforms. Hetero platforms may include one or more hetero compute engines. Each such hetero compute engine is optimized for high-performance execution of specific types of computations. The computations may be off-loaded onto these platforms and executed on one or more of the compute engines. These computations may be represented as compute graphs. Nodes represent individual compute functions to be executed on a compute engine while edges represent data and control dependencies between these computations. Deep-leaning model(s) is an example of compute graphs accelerated on deep-leaning (DL) acceleration platforms.

Execution of an entire compute graph on a hetero platform may be performed by a centralized graph scheduler running on a centralized host, either outside or inside the hetero platform. As discussed above, this centralized scheduler is a bottleneck to performance of the hetero systems or platforms.

The disclosed embodiments provide a mechanism for distributed scheduling of AI tasks, thereby overcoming the shortcomings of the centralized scheduling of existing system. Further, the disclosed embodiments can be realized with bare metal hardware without any dedicated operation system. This reduces the cost of ownership (TCO) and power consumption of hetero systems or platforms.

As will be discussed herein a compute graph is a high-level representation for compute functions of an AI task, and a low-level control graph is generated from a compute graph by compilation and contains the instruction for scheduling the AI task. A compute function is executed by a compute engine. A compute engine is configured to accelerate execution of compute functions. In an embodiment, the compute engine is embedded in a hetero computing platform.

It should be noted that the disclosed embodiments will be discussed with reference to specific embodiments of acceleration of AI tasks. However, the disclosed embodiments are applicable for any type of compute task.

FIG. 1A is an example diagram of an AI acceleration system 100 utilized to describe the various disclosed embodiments. System 100 is utilized to accelerate the operations of AI tasks including, but not limited to, deep-learning tasks by allowing decentralized scheduling of AI tasks. As will be discussed below, an AI task can be represented using a compute graph.

System 100 includes a plurality of application servers 110, an AI accelerator (AIA) appliance server 120, and a number of switches 130 connecting the various components of the system 100. In an embodiment, each of the switches 130 is an Ethernet switch.

Each application server 110 executes an AI application over an AI software framework. Such a framework may be, for example, TensorFlow®, Caffe, Pytorch®, or CNTK®, and the like.

Each application server 110 further communicates with the AIA appliance server 120 configured to execute specific AI processing functions. The AIA appliance server 120 is designed according to the disclosed embodiments to accelerate the execution of the AI tasks. The AIA appliance server 120 may include, in one configuration, an AIA switch 121 with a plurality of AI accelerators 122 that are attached to the network (hereinafter network-attached NA-AIA engine). Each NA-AIA 122 is coupled to its own memory (MEM). The AIA switch 121 may be an Ethernet switch. In one embodiment, the AIA appliance server 120 includes only one NA-AIA 122. The disclosed embodiments are applicable for both arrangements, i.e., a single NA-AIA (chip) or multiple NA-AIAs (chips). In both embodiments, the scheduling techniques disclosed herein are related to scheduling AI functions among the CEs in a single NA-AIA 122.

Figure 1B:
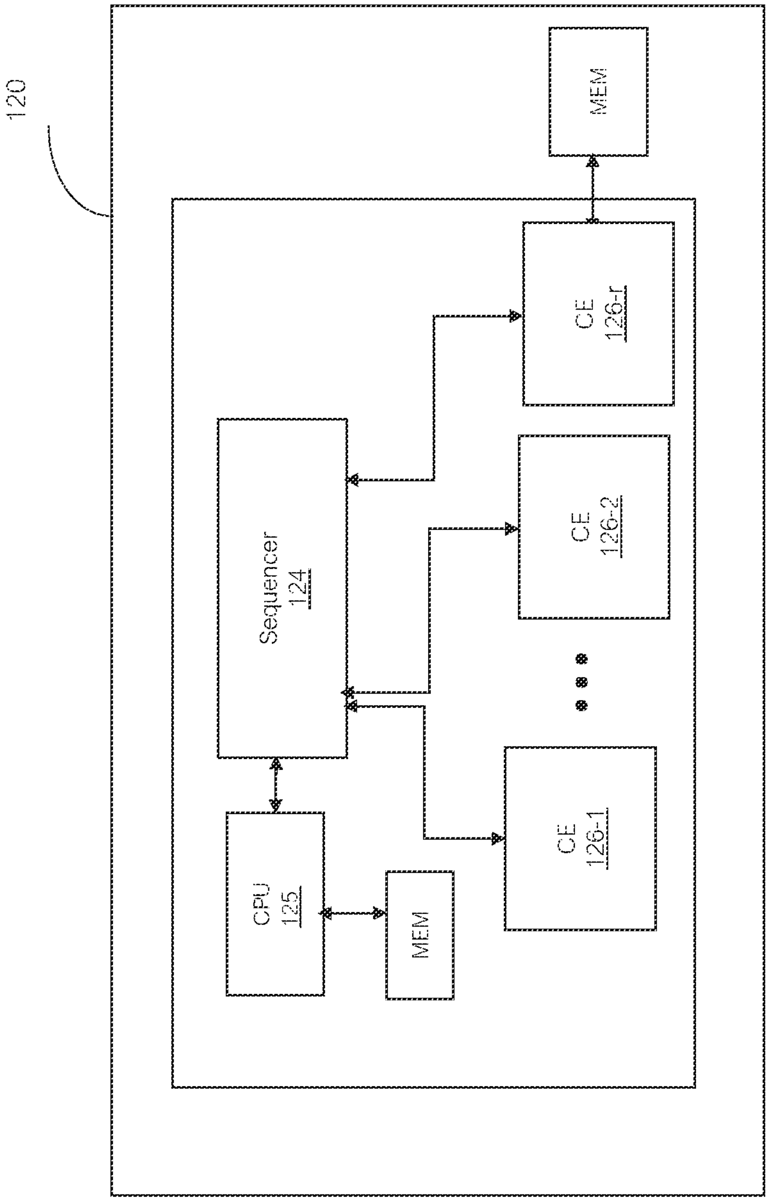
FIG. 1B is a block diagram of a network-attached AI accelerator operable in the system shown in FIG. 1A.

As shown in FIG. 1B, a NA-AIA 122 includes a sequencer 124, a host CPU 125, and a plurality of compute engines (CEs) 126. In an embodiment, the compute engines (CE) 126 are of different type, thereby creating aa hetero architecture or platform. In the example shown in FIG. 1, CE 126-1 and CE 126-2 are of different types.

The compute engines 126 are configured to accelerate execution of compute functions. The host CPU 125 is configured to provision the compute engines 126 based on a low-level control graph compiled by a compiler 170 (FIG. 1A).

The sequencer 124 is configured to control an execution sequence of the compute functions of the AI job and push such functions to the appropriate compute engines based on the generated graph. In response, the compute engines 126 push their processing results directly to queues (not shown) in the sequencer 124. The execution sequence includes a full sequence of operations or compute function required to execute an AI job. The sequencer 124 is configured to manage all the operations in the execution sequence until receipt of all final results from the compute engine 126. It should be noted that the sequencer 124 is not a monolithic centralized component.

A compute engine 126 is a dedicated processor (or an accelerator) configured to perform a specific function, thus offloading the processing of an AI job from the application's host CPU 125 or the AI-server host CPU. A compute engine 126 may include one or more neural network core processors, a GPU, an FPGA, a DSP (or multiple DSP cores), one or more video codec core processors, one or more CPU processor cores, a deep neural network (DNN) accelerator, and the like. It should be noted that the compute engines 126 can support acceleration of tasks that are not AI tasks.

An AI job may include multiple functions and may be processed in a NA-AIA 122 in multiple stages. For example, an AI job may include a request to run a compute graph with specific input/output buffers. Upon completion of each stage, the next step for execution is processed by the control graph. It should be noted that the data, control, or both, can flow from an accelerator to the sequencer 124. A compute engine 126 that completes the processing of an AI Job returns the processing results to the sequencer 124, which, in return, provides the results (or responses) to the application(s) requesting the execution of the respective job. The data itself may be transferred directly to the destination through a network, for example, using a RDMA protocol or a local bus. An example block diagram of the sequencer is provided in FIG. 7.

Referring now to FIG. 1A, the system 100 is further configured to provide a scalable solution as there are no computation and communication bottlenecks. In the system 100, additional NA-AIAs can be connected to the switch 121, thereby expanding the switch 121 to the AIA appliance server 120. The switch 121 is configured to have enough ports and bandwidth to allow data traffic to be transferred flawlessly between the application servers 110 and the AIA appliance server 120. It should be noted that the disclosed scheduling techniques are performed among multiple hetero compute engines 126 within a single NA-AIA 122. It should be noted that an AIA appliance server 120 may include a single NA-AIA 122 or multiple NA-AIAs 122.

In an embodiment, further acceleration may be achieved by utilizing a proprietary protocol (AI over fabric, or AIoF). The AIoF protocol is a communication protocol designed to support AI model installations and AI operations. The AIoF protocol removes the TCP overhead, latency issues, and the multiple data copies required to transfer data from the application server 110 to the appliance. In an embodiment, the AIoF protocol is configured using a shared memory over a network, in which the application can use its memory while the hardware transparently copies the AI model or the data from the application memory to an NA-AIA's memory via the network.

It should be noted that the decentralized scheduling disclosed herein can be executed on other arrangements of direct-attached AI acceleration systems including hetero acceleration and not limited to the arrangement shown in FIG. 1. The decentralized scheduling is enabled by a low-level control graph that corresponds to a compute graph received from the application server requesting to execute the AI application. A low-level control graph accepts one or more input buffers (such as but not limited to tensors) and may generate one or more output buffers. Compute nodes inside the low-level control graph consume intermediate buffers generated by already executed compute nodes they are data-dependent on. A buffer is a generic name for the data structure (the organization of the data) that is either the input or the output or moving between the different compute nodes (functions) of the low-level control graph. An example is a tensor of deep-learning compute graphs.

In an embodiment, the compiler 170 resides outside of AIA appliance server 120. The provisioning determines the scheduling of compute functions of an AI job. The provisioning process is discussed in greater detail below. In an embodiment, the compiler 170 may be executed over a server. An example of such a server (external to the AIA appliance server 120) is provided below with reference to FIG. 8.

Figure 2:
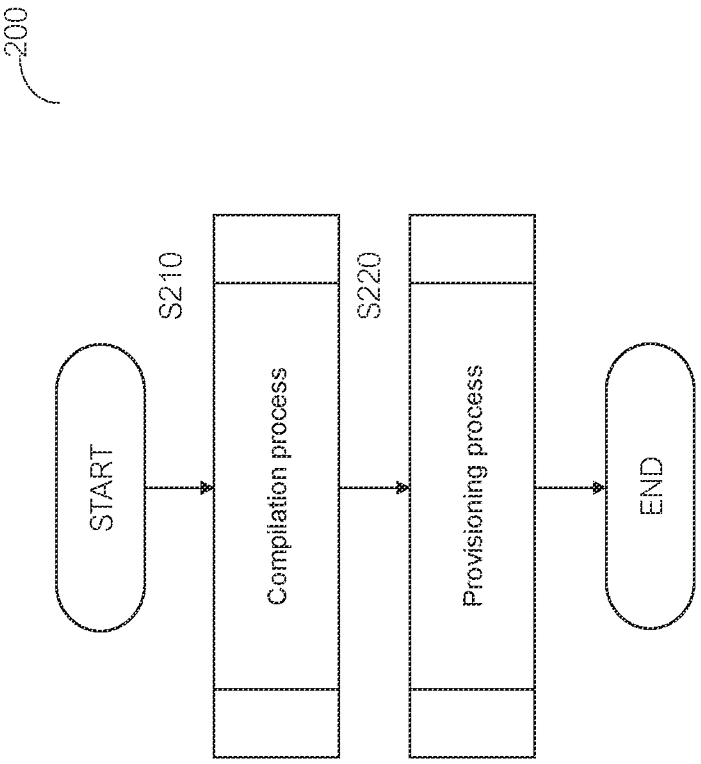
FIG. 2 is a flowchart of a method for transforming a compute graph into a low-level control graph according to an embodiment.

FIG. 2 shows an example flowchart 200 of a method for transforming a compute graph into a low-level control graph according to an embodiment. The low-level control graph allows the decentralized scheduling of compute functions according to an embodiment. The method shown in FIG. 2 includes two main processes that enable the transformation: compilation and provisioning.

In the compilation process, S210, a source compute graph is compiled into a low-level control graph. The low-level control graph includes compute nodes (encapsulating compute functions) and control nodes. Specifically, in an embodiment, compilation process, S210, includes optimizing compute functions in the input source compute graph (e.g., function fusion, etc.), determining the target of a compute engine type per compute function, determining the size and shape of the input and output buffers (or tensors) per compute node, derived from original data dependencies of the compute graph, and creating control nodes to handle control and data dependencies. Finally, based on the determined compute nodes, data dependencies and d control nodes are transformed to a low-level control graph. The low-level control graph is the output of the compilation process S210.

A compute function ('F') may be an execution of an AI task (or function). An example for a compute function may include a deep learning kernel (e.g., convolution), video processing, image processing, encoding, decoding, and the like. In should be noted that the compute function is not limited to an AI task. The compute function is executed by a compute engine (e.g., CE 126, FIG. 1).

A control node, in an embodiment, is a program (list of commands) which encapsulates all the logic of scheduling the next compute nodes or control nodes according to original data and control flow of the compute graph. A control node is created during the compilation process (S210) phase and mapped to specific resources (e.g., queues, JPUs) during the provisioning process (S220).

In an embodiment, the provisioning process, S220, includes customizing the low-level control graph. Specifically, S220 includes mapping each compute node and control node to a specific compute engine (CE) and a job processing unit (JPU). Further, each CE and JPU is allocated with dedicated input and output queues. In one configuration, the JPUs and queues are integrated in the sequencer (e.g., sequencer 124, FIG. 1). Examples for the mapping of compute and control nodes to CEs and JPUs are provided in FIG. 5.

S220 further includes creating a flow-table having entries for all control nodes, and updating the control nodes with the scheduling logic. In an embodiment, the scheduling logic includes creating and enqueuing the job descriptor (JD) into specific input and/or output queues.

A job descriptor (JD) is a data structure representing the current stage of computation by a control node mapped to a JPU. The JD includes a predefined compute function (i.e., "next compute node") to invoke on next CE, addresses of its input/output buffers and the next control node following the compute node, and the next JPU to execute the next control node. Each CE and JPU de-queues the next JD from their input queue. The de-queued JD directs the execution of a compute node or a control node. Alternatively, CE de-queues the JD from the input queue, invokes the next compute node, and enqueues the JD in next queue. The JPU de-queues the JD from the input queue and executes the next control node (which updates the JD according to the scheduling logic of the control node) and enqueue it for next CE or JPU. The JD accompanies the graph execution to allow a decentralized scheduling of the graph.

It should be noted that the low-level control graph provided according to the disclosed embodiments can support parallelism to execute multiple compute nodes in parallel (e.g., fork) as well as perform synchronization (e.g., join/barriers) to wait for completion of parallel computations before proceeding to next computation. Further, the low-level control graph can support efficient execution of a control flow, e.g., "if-then" statements or loops.

In an embodiment, the compilation process (S210) is performed by the compiler 170 (FIG. 1) and the provisioning process (S220) by the host-CPU 125 (FIG. 1). It should be noted that the process of transforming a compute graph into a low-level control graph can be controlled entirely either by the compiler 170 or the host-CPU 125. When controlled by the compiler 170, is configured to compile the low-level compute graph and cause the host-CPU 125 to provision the low-level control graph for execution on CEs and JPUs included in the NA-AIA 122 (FIG. 1). When controlled by the host-CPU 125, the host-CPU 125 is configured the compiler 170 to compile the low-level control graph, receive the compiled low-level control graph, and provision the JPUs accordingly.

Figure 3:
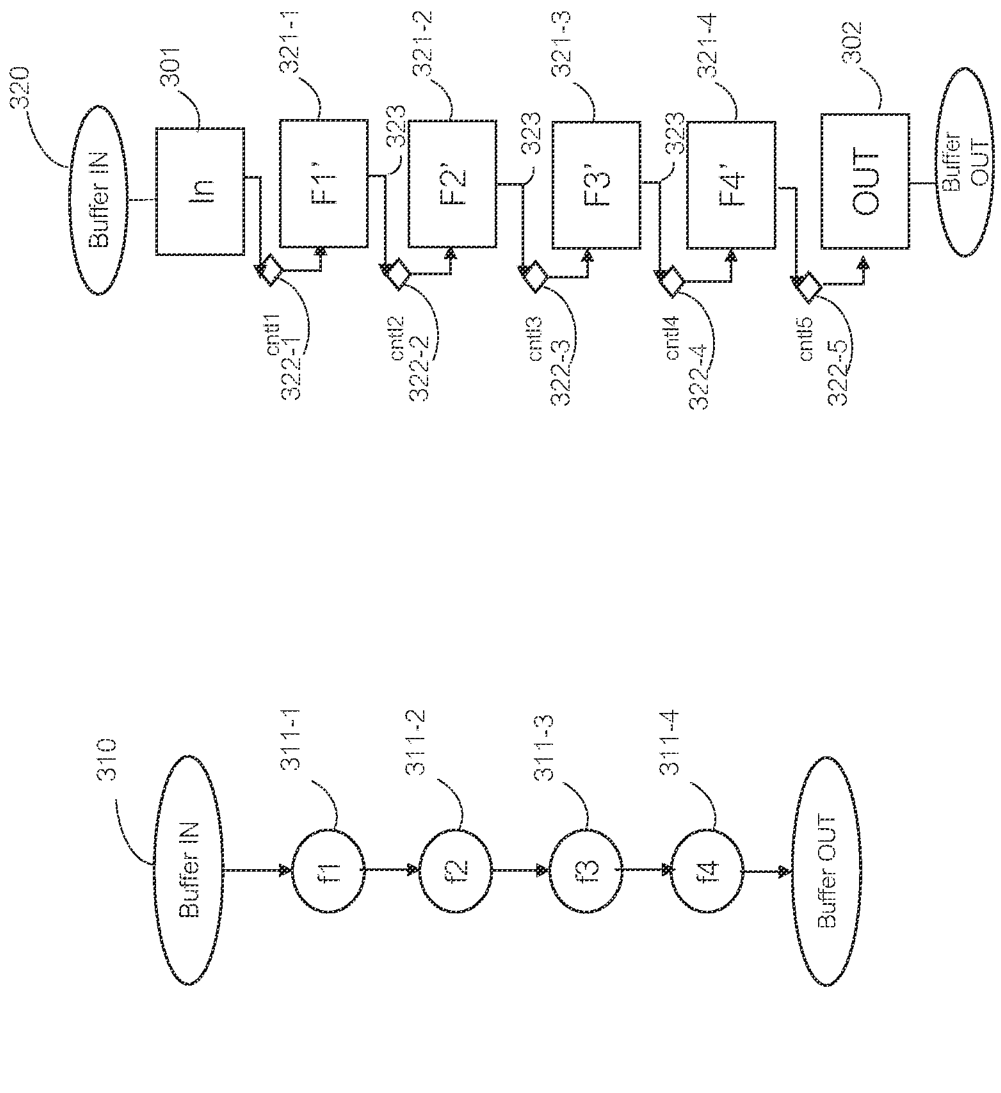
FIG. 3 is a schematic diagram demonstrating the translation from a source compute graph to a low-level control graph according to an embodiment.

FIG. 3 is a schematic diagram demonstrating the translation from a source compute graph 310 to a low-level control graph 320 according to an embodiment. The source compute graph 310 is typically provided by the application requesting to execute an AI application on, for example, an AIA appliance server (e.g., server 120, FIG. 1). The source compute graph 310 may be, for example, computation of a deep-learning model. The compute graph 310 includes functions 311 (f1, . . . f4) to be executed in sequence. In prior art solutions, scheduling of such compute functions is performed by a centralized scheduler running on a centralized host. As noted above, such an approach suffers from a number of limitations.

According to the disclosed embodiments, to allow decentralized scheduling, the source compute graph 310 is translated to the low-level control graph 320. This allows direct mapping of functions to compute engines with specific scheduling logic. That is, the scheduling features of the low-level control graph 320 maintains the data and control-flow dependencies of the source compute graph 310. The low-level control graph 320 includes an IN node 301 and an OUT node 302. These nodes are special compute nodes (targeted to the network engine) that encapsulate all prerequisites to enable execution of a compute graph. The prerequisites include allocating and initializing buffers (IN) and sending final outputs back to application host and releasing reserved resources (e.g., queues, JPU).

The example low-level control graph 320 includes compute nodes 321 and control nodes 322. The compute nodes 321 (F1', . . . , F4') correspond to the functions 311 (f1, . . . , f4) in the source compute graph 310. Edges 323 of the control graph 320 represent control dependencies between two compute nodes 321, hence dependencies between functions.

A control node 322 is placed before (input) and after (output) each compute node 321. In the example shown in FIG. 3, there are 5 control nodes (cntl #1, . . . , cont #5). Each control node 322 is a control program which is responsible for invoking the next compute node 321 in the control graph 320 on a target compute engine (not shown in FIG. 3).

In one embodiment, a control program maintained or encapsulated in each compute node 322 may be generated during the compilation process according to the data- and control flow in the source compute graph 310. Further, the control programs can be updated during the provisioning process according to the available platform resources e.g., available compute engine. The firmware of each compute engine is extended to invoke the next control program (hence, its continuation) after the computation of a given compute node is completed. According to the disclosed embodiments, invocation of computations and control programs are always performed asynchronously. The callee never returns to its caller.

That is, in this example, each compute node 321 waits for its preceding compute node to complete processing before starting its processing. For example, node 321-2 ('F2') waits for compute node 321-1 to its complete processing. In an embodiment, each control node 322 may be configured to allocate intermediate buffers to be used in follow-up computations by its respective computing node 321. Intermediate buffers refer to the data that is generated by intermediate nodes in the graph. Further, each control node 322 calls for the next compute node 321 in the sequence to start processing. For example, control node 322-4 calls for compute node 321-4.

It should be noted that the amount of communication between control nodes 322 and compute nodes 321 is as with a centralized graph scheduling, except that such communication spreads across multiple JPUs, thereby reducing potential performance bottlenecks.

Figure 4A:
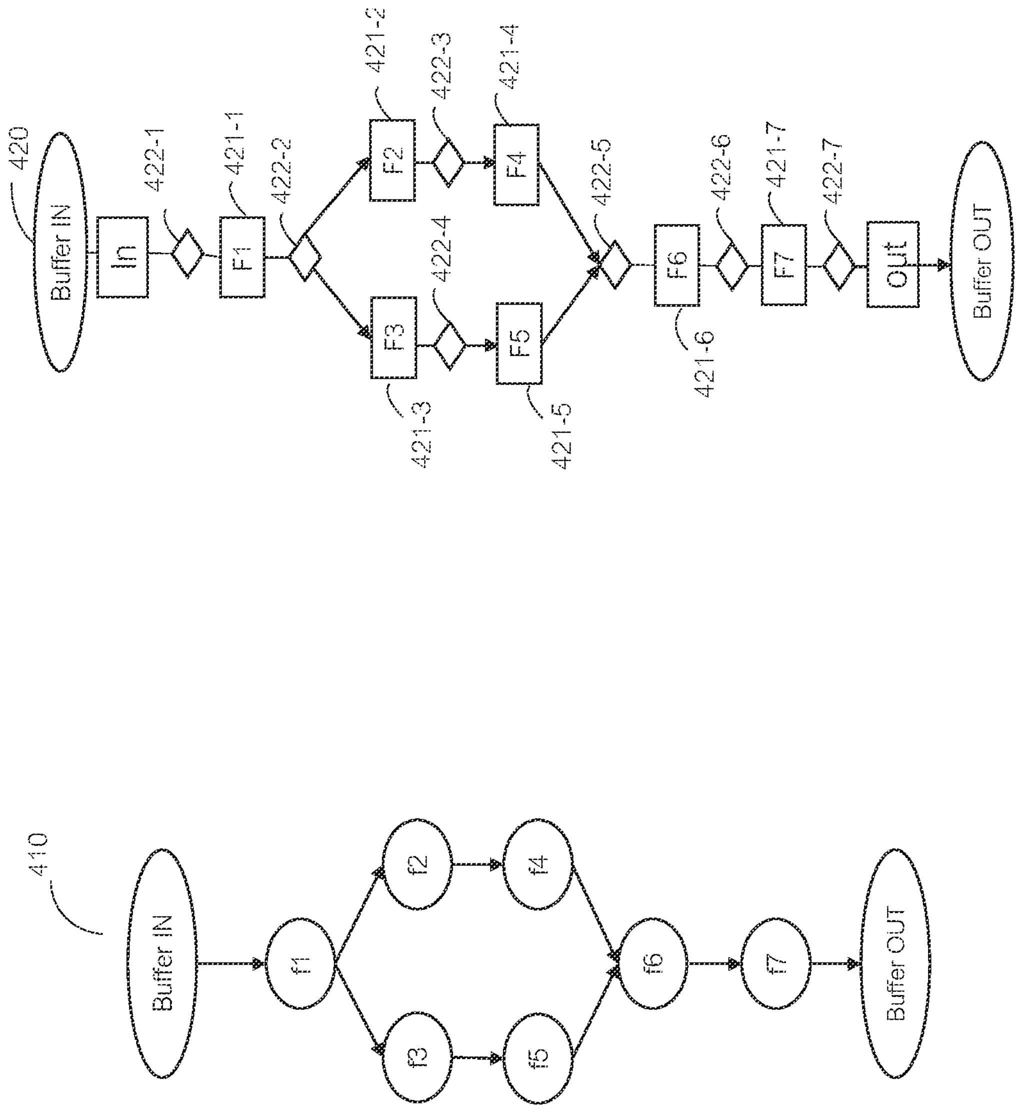
FIGS. 4A and 4B illustrate low-level control graphs generated according to an embodiment.

FIG. 4A shows an example low-level control graph 420 that can support parallel processing according to an embodiment. The low-level compute graph 420 is a transformation of a source compute graph 410.

The low-level control graph 420 includes a collection of compute nodes 421 and control nodes 422. However, in this configuration, two or more compute nodes 421 can process functions in parallel. For example, compute nodes 421-2 and 421-3 can be executed in parallel processing functions 'F2' and 'F3'. Same for compute nodes 421-4 and 421-5.

In the graph 420, the control node 422-2 calls for compute nodes 421-2 and 421-3, when compute node 421-1 completes its processing. Similarly, the control node 422-5 waits for (join) compute nodes 421-4 and 421-5 to complete the processing before calling compute node 421-6. It should be noted that when multiple compute nodes are called, the preceding control node (like 422-2) creates a separate JD for each parallel compute node, and enqueue the created JDs into corresponding queues. The process of enqueuing JDs is demonstrated below.

Figure 4B:
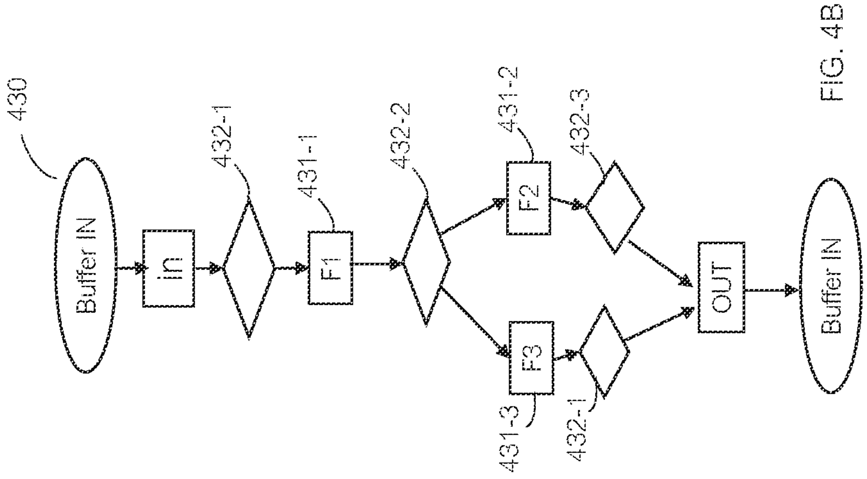

FIG. 4B shows an example low-level compute graph 430 when the source control graph includes a control flow statement. An example for a control flow is "if-then" statement. In the example, the control node is configured to decide which compute node to call based on a condition. In the example graph 430, nodes 431 are compute nodes and nodes 432 are control nodes.

In the example, compute node 431-1 computes an "if-then" statement (e.g., $\alpha>\beta$). If the statement is true, compute node 431-2 is called; otherwise, the compute node 431-3 is called. In the example shown in FIG. 4B, the control node 432-2 reads the output buffer of compute node 431-1 which holds the condition (e.g., if $\alpha>\beta$) to determine which compute node (431-2 or 431-3) to call next.

Figure 5:
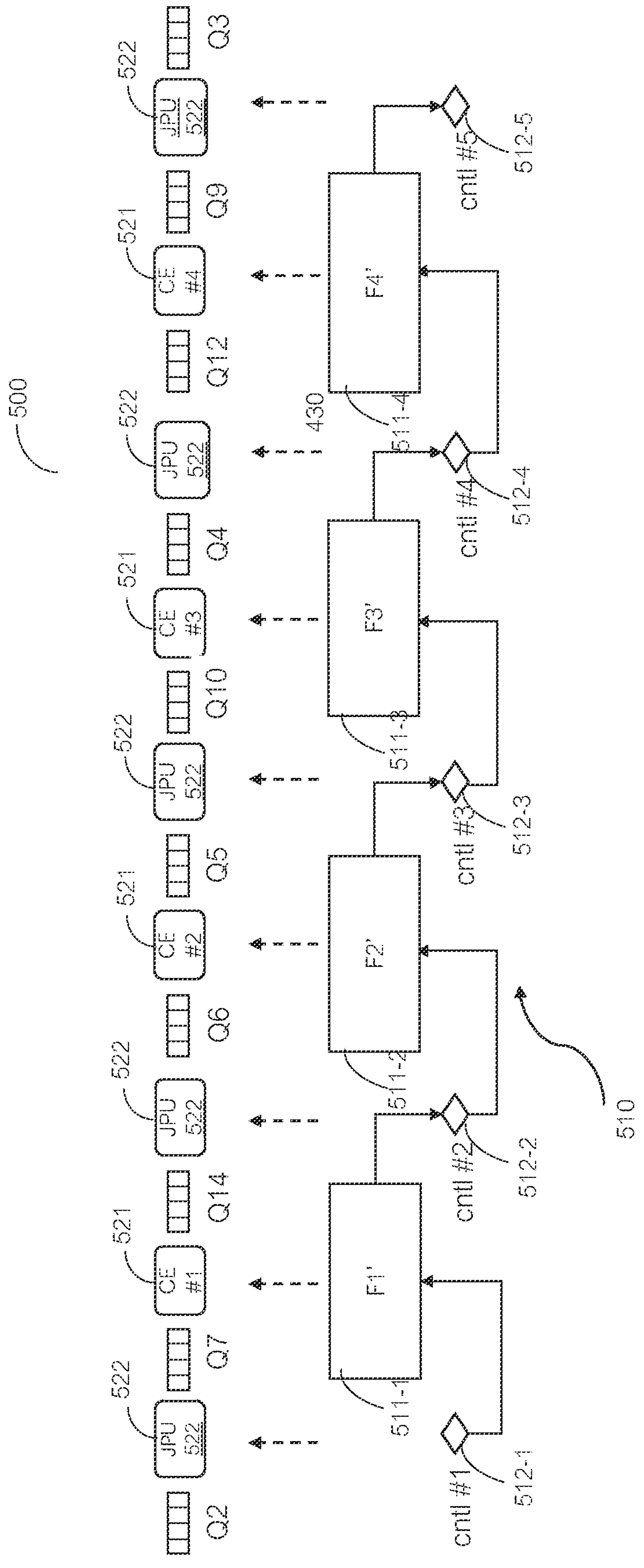
FIG. 5 is a schematic diagram illustrating the decentralized scheduling of the AI task according to an embodiment.

FIG. 5 is a schematic diagram 500 illustrating the decentralized scheduling of the AI task according to an embodiment. The AI task is represented by a source compute graph being translated into a low-level control graph as discussed above. In the example shown in FIG. 5, the low-level control graph 510 is the output of the transforming process. The graph 510 includes 4 compute nodes 511-1 through 511-4 running compute functions (F1' through F4') and 5 control nodes 512-1 through 512-2 (cnlt #1 through cntl #5).

The graph 510 is mapped to hardware executing the control and compute nodes. Specifically, each compute node 511 is mapped to a compute engine (CE) 521, and each control node is mapped to a job processing unit (JPU) 522. As noted above, a compute engine is a dedicated processor (or an accelerator) configured to perform a specific function, thus offloading the processing of an AI task from the application host CPU or the AI-server host CPU. A compute engine may include one or more neural network core processors, a GPU, an FPGA, a DSP (or multiple DSP cores), one or more video codec core processors, one or more CPU processor cores, a deep neural network (DNN) accelerator, and the like. A JPU 522 can be realized as a tiny control processor. Each CE 521 and JPU 522 are assigned with an input and an output queue (Q). The JPUs 522 and queues (Q1, . . . , Q7) may be embedded in a sequencer, an example of which is provided in FIG. 7.

In an embodiment, the assignment of queues is performed during the provisioning process. Each entry in the flow-table points to a control node. A JD arriving in an input queue of a JPU includes a reference to the entry in the flow table with the specific control node to run in that JPU. A control node executes a set of commands, defined during compilation and provisioning processes to handle scheduling and execution of a specific computational stage of the compute graph. The set of commands may include updating or creating JD;

waiting for previous computations to complete; testing buffer values to decide on the next compute nodes in case of control flow; loading and testing a specific past state of control, checking descriptor parameters like stream identifiers and enqueue JD for next computation stage).

Figure 6:
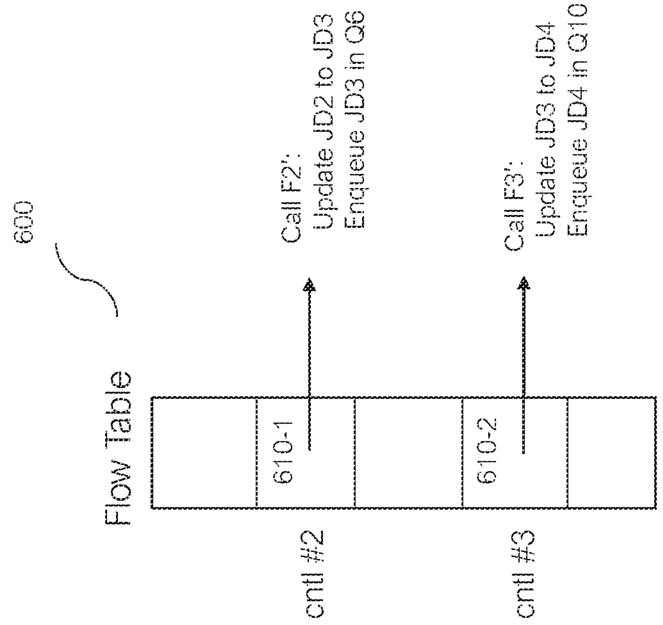
FIG. 6 is an example flow table generated during the provisioning of a compute graph.

A flow table 600 shown in FIG. 6 includes entries 610-1 and 610-2 holding commands to be executed by control nodes 512-2 and 512-3. The commands of the control node 512-2 define how to invoke the compute node 511-2 (running 'F2'): update JD2 to JD3; and enqueue JD3 in Q6. The commands of the control nodes 511-3 define how to invoke the compute node 511-3 (running 'F3'): update JD3 to JD4; and enqueue JD4 in Q10. Note "Q6" and Q10" are shown in FIG. 5. Note that both JD3 and JD4 indicate how to proceed with the next computation in the compute graph, respectively. For example, JD3 indicates that the next compute node on CE #2 (See, FIG. 5) should run F2' ("next compute node"), then enqueue the JD3 in Q5 ("next queue") of a JPU to run the control node with the flow-table entry "cont #3" (see FIG. 6).

The following is an example of the JD3 and JD4 mentioned above.

JD3:
  shared state:
  Next control node: cntl #3
  Next queue: Q5
  Next compute node: F2', Buffer_1, Buffer_2
JD4:
  shared state:
  Next control node: cntl #4
  Next queue: Q4
  Next compute node: F3', TBuffer_2, Buffer_3

Figure 7:
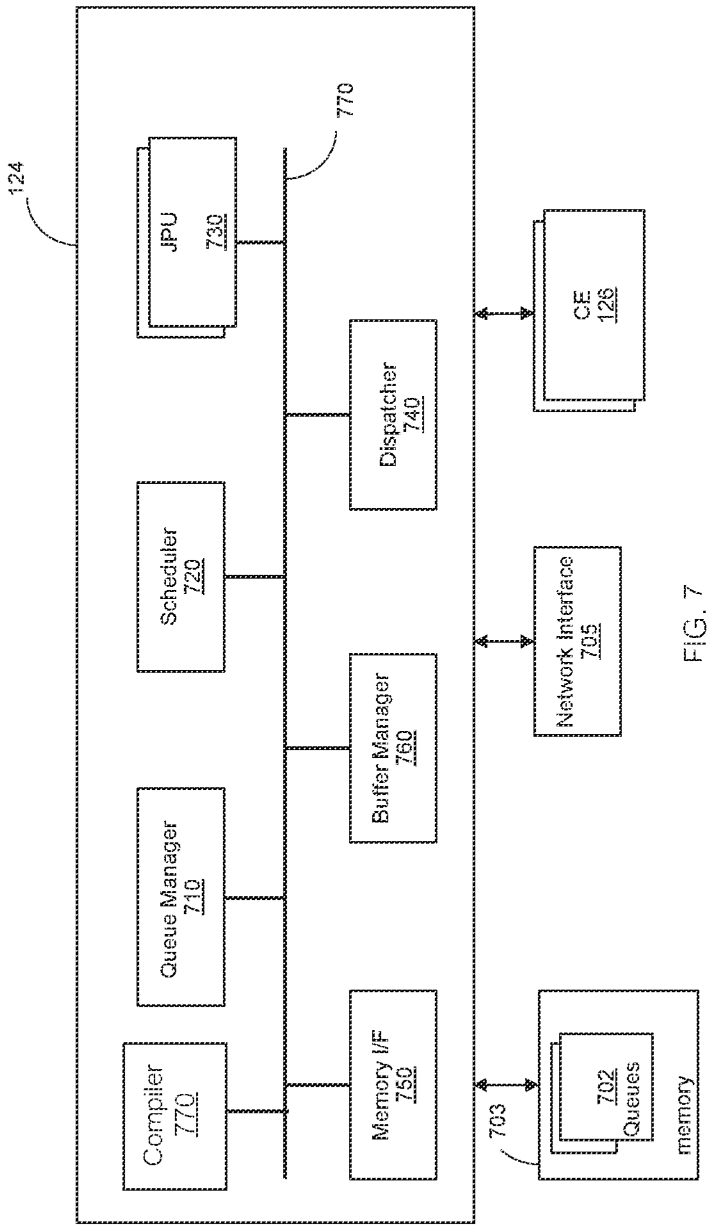
FIG. 7 is a block diagram of the sequencer designed according to an embodiment.

The share state as defined in JD3 and JD4 is:
  Buffer_in: <address>
  Buffer_1: <address>
  Buffer 2: <address>
  Buffer_3: <address>
  Buffer_out: <address>
  shared counters: for join operations FIG. 7 is an example block diagram of the sequencer 124 designed according to an embodiment. The sequencer 124 is configured to transform a source compute graph into a low-level control graph, thereby enabling the distributed scheduling.

The sequencer 124 includes a queue manager 710, a queue scheduler 720, a plurality of job processing units (JPUs), collectively referred to as JPUs 730 or as a JPU 730, a dispatcher 740, a memory interface 750 that can be accompanied by a caching system, a buffer manager 760. The sequencer 124 is configured to interface with external components including a memory 703, the compute engines 126, and a network interface 705, providing connectivity to a network (not shown). In an example configuration, some or all of the external components may be integrated into the sequencer 124. In some configurations, the sequencer 124 is not connected to the network, and jobs are received from an application executed by a server hosting the sequencer 124.

In an embodiment, the sequencer includes a Just In time (JIT) compiler 770 that can transform the compute graph to a low-level control graph, as discussed in detail above. In an example embodiment, the compilation may include a JIT operation that adapts a graph to a specific runtime condition, such as resources currently being utilized. As an example, the low-level control graph is generated to allow for load balancing of resources among free compute engines.

The queue manager 710 is configured to hold the information of all queues 702 in the sequencer 124. The queues 702 are data structures saved in the memory 750. Queues 702 are used as an asynchronous media interface, between their inputs and outputs, so they allow the asynchronous feeding of the jobs coming from the network into the AI accelerators and feeding the various accelerators through the pipeline execution stage. The queues 702 may assign different functionalities, such as input, output, and service queues, or may be assigned to a dedicated component (e.g., a network interface or a general processor). The queue manager 710 may also share multiple queues 702 to include data of the same job.

The memory 750 is a memory of a device (e.g., a DLA server) hosting the sequencer 124. In some configurations, the memory 703 may be part of the sequencer 124.

In an embodiment, the sequencer 124, by means of a JPU 730, is configured to generate an execution that can be assigned to a control node part of a low-level control graph. As noted above, this allows for the distribution of the processing of various functions to multiple compute engines. For example, an AI job may be an object classification in an image. The sequence may include resizing an image, object detection, and object classification of each identified object. The resizing is a function (not an AI process) and can be performed by one compute engine, the object detection is a function performed by another compute engine, and each object classification is a function performed by a third compute engine.

In an embodiment, all queues 702 are configured with a unified format and each queue's information is stored in a dedicated management table (not shown) in the memory 750. The queue manager 710 directly interfaces with the queues 702, where components are written or read from the queues 702, and requests the queue manager 710 to perform such operations. In an embodiment, after each operation, in the queues 702, the queue manager 710 is configured to update entries of the management table to an operation made. The operation may include writing to a queue, reading from a queue, de-queuing a selected queue, and the like.

In an embodiment, each JPU 730 is configured to receive the job descriptor (JD), decide on the next operation (compute node in the control graph) to be executed, and send the job descriptor to a destination component performing the next operation. A destination component may include a queue, the network interface 705, and a CE 126.

A dispatcher 740 is a circuit configured to interface with any compute engine 126. A dispatcher 740 is configured to at least activate, control, and manage the selected accelerator. In the embodiment shown in FIG. 7, multiple dispatchers 740 are available, where each dispatcher 740 is assigned to a designated compute engine 126 and is further configured to support the unique requirements and activation functions of its respective compute engine 126.

The memory interface 750 is configured to provide the interface to the memory 703. The memory interface 750 is configured to receive all the requests from the components of the sequencer 124 and to send such requests to the memory 703. To serve all memory requests, the memory interface 750 may implement an arbitration mechanism between the various components and handle all open requests until completion. The memory 703 may be composed of internal memories that are directly mapped or serve as cache and external memory. The memory 703 may be realized as a DRAM, Flash, and the like.

The buffer manager 760 is configured to hold multiple lists of free or used buffers in a system hosting the sequencer 124. Such lists serve to allocate and release buffers (with memory allocation in the memory sub-system). The lists are maintained per buffer size and can support various buffer sizes. The size of each list can be fixed or dynamically controlled.

The different components of the sequencer 124 can interact with the buffer manager 760 to request a new buffer (memory allocation), or to release a used buffer (memory de-allocation) that is no longer needed. The buffer manager 760 is the central reservation center for buffers in the system and maintains updated status on allocation of buffers in the system.

In an embodiment, the queue manager 710, queue scheduler 720, JPUs 730, dispatcher 740, memory interface 750, and the buffer manager 760 are connected via a bus 770. The bus 770 may be a fast interconnect bus, such as PCI. In some configurations, the memory 703, and compute engines 126, and/or the network interface 705 are also connected to the bus 770. The bus may be a local bus or may be distributed between multiple devices encapsulated and carried over various network protocols. Examples for such protocols include, for example, Ethernet, InfiniBand, and the like, or the AI-over-Fabric (AIoF) protocol.

In an embodiment, the sequencer's 124 architecture allows concatenation of multiple functions for scalable execution of AI jobs with multiple hierarchies and in multiple capacities while ensuring predefined SLA.

The network interface 705, in an example embodiment, may implement an AI over fabric (AIoF) protocol. The AIoF protocol is a communication protocol designed to support AI service, AI model installations, and other AI operations. The AIoF protocol is configured for reduced latency associated with a TCP overhead and the multiple data copies required to transfer data over the network. In an embodiment, the AIoF protocol is configured using a shared memory over a network, in which the application can use its memory while the hardware transparently copies the job data from the application's memory to the memory 703 via the network. In other configurations, the network interface 705 provides an interface to a communication protocol, such as Transmission Control Protocol (TCP), remote direct memory access (RDMA), RDMA over converged Ethernet (ROCE), InfiniBand, and the like.

The sequencer 124 and/or its various components may be realized as one or more hardware logic components and circuits. For example, and without limitation, illustrative types of hardware logic components that can be used include: field programmable gate arrays (FPGAs), application-specific integrated circuits (ASICs), application-specific standard products (ASSPs), system-on-a-chip systems (SOCs), general-purpose microprocessors (CPUs), microcontrollers, digital signal processors (DSPs), and the like, or any other hardware logic components that can perform calculations or other manipulations of information. Software executed by a hardware logic component shall be construed broadly to mean any type of instructions, whether referred to as software, firmware, middleware, microcode, hardware description language, or the like. Instructions may include code (e.g., in source code format, binary code format, executable code format, or any other suitable format of code).

The sequencer 124 can be integrated in a remote direct-attached AI acceleration systems, such as those discussed with reference to FIG. 1.

Figure 8:
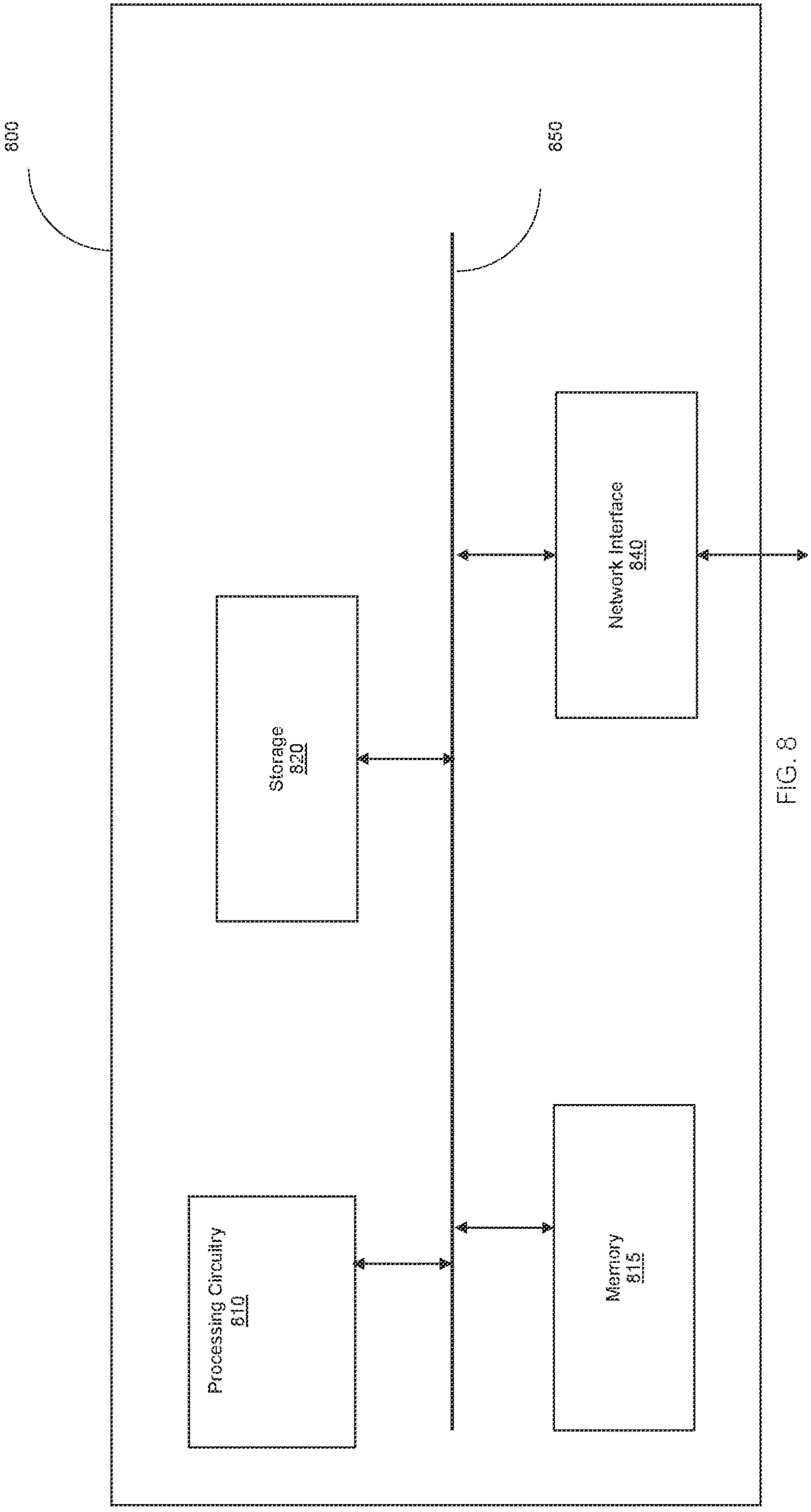
FIG. 8 is a block diagram of a server executing the compiler implemented according to an embodiment.

FIG. 8 is an example block diagram of a server 800 executing the compiler 170 implemented according to an embodiment. The server 800 includes a processing circuitry 810 coupled to a memory 815, a storage 820, and a network interface 840. In another embodiment, the components of the server 800 may be communicatively connected via a bus 850.

The processing circuitry 810 may be realized as one or more hardware logic components and circuits. For example, and without limitation, illustrative types of hardware logic components that can be used include field-programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 815 may be volatile (e.g., RAM, etc.), non-volatile (e.g., ROM, flash memory, etc.), or a combination thereof. In one configuration, computer-readable instructions to implement one or more embodiments disclosed herein may be stored in storage 820.

In another embodiment, the memory 815 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 810 to perform the various processes described herein. Specifically, the instructions, when executed, cause the processing circuitry 810 to perform the embodiments described herein.

The storage 820 may be magnetic storage, optical storage, and the like, and may be realized, for example, as flash memory or other memory technology, CD-ROM, Digital Versatile Disks (DVDs), or any other medium which can be used to store the desired information.

The network interface 840 allows the device to communicate at least with the servers and clients. It should be understood that the embodiments described herein are not limited to the specific architecture illustrated in FIG. 8, and other architectures may be equally used without departing from the scope of the disclosed embodiments.

The embodiments disclosed herein can be implemented as hardware, firmware, software, or any combination thereof. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether such a computer or processor is explicitly shown.

In addition, various other peripheral units may be connected to the computer platform such as an additional network fabric, a storage unit, and the like. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in the same manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

What is claimed is:

1. A method for decentralized scheduling of compute graphs on heterogenous platforms, comprising:

compiling a source compute graph into a low-level control graph, where the source compute graph represents a set of compute functions to be performed on compute engines embedded in the heterogenous platform, and wherein the low-level control graph includes compute nodes and control nodes;

provisioning the low-level control graph for execution on compute engines and job processing units (JPUs), wherein the low-level control graph determines a schedule of execution of the set of compute functions, wherein a control node in the low-level control graph schedules a next compute node to execute a compute function during execution of the low-level control graph; and executing the provisioned low-level control graph over time wherein, after a compute engine completes execution of a compute function of the set of compute functions, a job processing unit of the JPUs executes a control node of the low-level control graph to schedule a next compute node that represents a predefined compute function by dispatching the next compute node for execution on one of the compute engines, such that the compute nodes and the control nodes operate asynchronously as execution of the provisioned low-level control graph proceeds.

2. The method of claim 1, wherein compiling the source compute graph further comprises:

optimizing the set of compute functions in the source compute graph;

determining a compute engine type for each compute function;

determining at least one input buffer and at least one output buffer for each compute node, wherein the least one input buffer and the least one output buffers derived by data dependencies of the source compute graph;

creating control nodes to handle control and the data dependencies; and transforming the compute nodes, control nodes, the data dependencies to the low-level compute graph.

3. The method of claim 1, wherein when a compute node completes an execution, the execution proceeds to the next compute node on the low-level control graph.

4. The method of claim 1, wherein a compute function of the set of functions includes an execution of an artificial intelligence (AI) task.

5. The method of claim 4, wherein the AI task includes any one of: a deep learning kernel, a video processing, an image processing, an encoding, or a decoding.

6. The method of claim 4, wherein the source control graph is provided by an AI application to be executed by an AIA appliance server.

7. The method of claim 1, wherein provisioning the low-level control graph further comprises:

mapping each compute node to a specific compute engine out of the compute engines embedded in the heterogenous platform;

mapping each control node to a job processing unit; and allocating to each compute engine and job processing unit at least one dedicated input buffer and at least one output buffer, wherein the compute engines embedded in the heterogenous platform are of different types.

8. The method of claim 7, wherein provisioning the low-level control graph further comprising:

creating a flow table having entries for all control nodes; and updating entries in the flow table with a scheduling logic, wherein the scheduling logic enqueuing generated job descriptors (JDs) into one or more of the input and output queues.

9. The method of claim 7, wherein a job descriptor is a data structure representing a current stage of computation performed by a control node, wherein each of the job descriptors includes a predefined compute function to invoke on a next compute engine and a next control node following a current compute node, and the next job processing unit to execute the next control node.

10. The method of claim 7, wherein the low-level control graph is compiled to support parallel execution of a plurality of compute nodes and synchronization of completion of parallel computations.

11. The method of claim 1, wherein the low-level control graph is compiled to support execution of control flow statements.

12. The method of claim 1, wherein a control node executes a set of commands, defined during compilation and provisioning processes to handle scheduling and execution of a specific computational stage of the compute graph.

13. The method of claim 12, wherein the set commands may include updating or creating JD; waiting for previous computations to complete; testing tensor values to decide on the next compute nodes in case of control flow; loading and testing a specific past state of control; and checking descriptor parameters.

14. The method of claim 1, wherein a compute engine includes any one of one: an array of neural network core processors, a GPU, an FPGA, a DSP, a plurality of DSP cores, at least one video codec core processor, at least one CPU processor core, and a deep neural network (DNN) accelerator.

15. A non-transitory computer readable medium having stored thereon instructions for causing a processing circuitry to execute a process for decentralized scheduling of compute graphs on heterogenous platforms, the process comprising:

compiling a source compute graph into a low-level control graph, wherein a source compute graph represents a set of compute functions that to be performed on compute engines embedded in the heterogenous platform, and wherein the low-level control graph includes compute nodes and control nodes;

provisioning the low-level control graph for execution on compute engines and job processing units (JPUs), wherein the low-level control graph determines a schedule of execution of the set of compute functions, wherein a control node in the low-level control graph schedules a next compute node to execute a compute function during execution of the low-level control graph; and executing the provisioned low-level control graph over time wherein, after a compute engine completes execution of a compute function of the set of compute functions, a job processing unit of the JPUs executes a control node of the low-level control graph to schedule a next compute node that represents a predefined compute function by dispatching the next compute node for execution on one of the compute engines, such that the compute nodes and the control nodes operate asynchronously as execution of the provisioned low-level control graph proceeds.

16. A compiler for decentralized scheduling of compute graphs on heterogenous platforms, comprising:

a processing circuitry; and a memory, the memory containing instructions that, when executed by the processing circuitry, configure the compiler to:

compile a source compute graph into a low-level control graph, wherein the source compute graph represents a set of compute functions that to be performed on compute engines embedded in the heterogenous platform, and wherein the low-level control graph includes compute nodes and control nodes;

provisioning the low-level control graph for execution on compute engines and job processing units (JPUs), wherein the low-level control graph determines a schedule of execution of the set of compute functions, wherein a control node in the low-level control graph schedules a next compute node to execute a compute function during execution of the low-level control graph; and execute the provisioned low-level control graph over time wherein, after a compute engine completes execution of a compute function of the set of compute functions, a job processing unit of the JPUs executes a control node of the low-level control graph to schedule a next compute node that represents a predefined compute function by dispatching the next compute node for execution on one of the compute engines, such that the compute nodes and the control nodes operate asynchronously as execution of the provisioned low-level control graph proceeds.

17. A method for decentralized scheduling of compute graphs on heterogenous platforms, comprising:

receiving a low-level control graph compiled from a source compute graph, wherein the source compute graph represents a set of compute functions to be performed on compute engines embedded in the heterogenous platform, and wherein the low-level control graph includes compute nodes and control nodes;

provisioning the low-level control graph for execution on compute engines and job processing units (JPUs), wherein the low-level control graph determines a schedule of execution of the set of compute functions, wherein a control node in the low-level control graph schedules a next compute node to execute a compute function during execution of the low-level control graph; and executing the provisioned low-level control graph over time wherein, after a compute engine completes execution of a compute function of the set of compute functions, a job processing unit of the JPUs executes a control node of the low-level control graph to schedule a next compute node that represents a predefined compute function by dispatching the next compute node for execution on one of the compute engines, such that the compute nodes and the control nodes operate asynchronously as execution of the provisioned low-level control graph proceeds.

18. The method of claim 17, wherein provisioning the low-level control graph further comprises:

mapping each compute node to a specific compute engine out of the compute engines embedded in the heterogenous platform;

mapping each control node to a job processing unit; and allocating to each compute engine and job processing unit a dedicated input buffer and an output buffer, wherein the compute engines embedded in the heterogenous platform are of different types.

19. The method of claim 17, wherein provisioning the low-level control graph further comprising:

creating a flow-table having entries for all control nodes; and updating the control nodes with a scheduling logic, wherein the scheduling logic enqueuing generated job descriptors (JDs) into one or more of input and output queues.

20. The method of claim 19, wherein a job descriptor is a data structure representing a current stage of computation performed by a control node, wherein each of the job descriptors includes a predefined compute function to invoke on a next compute engine and a next control node following a current compute node, and the next job processing unit to execute the next control node.

21. A non-transitory computer readable medium having stored thereon instructions for causing a processing circuitry to execute a process for decentralized scheduling of compute graphs on heterogenous platforms, the process comprising:

receiving a low-level control graph compiled from a source compute graph, wherein the source compute graph represents a set of compute functions to be performed on compute engines embedded in the heterogenous platform, and wherein the low-level control graph includes compute nodes and control nodes;

provisioning the low-level control graph for execution on compute engines and job processing units (JPUs), wherein the low-level control graph determines a schedule of execution of the set of compute functions, wherein a control node in the low-level control graph schedules a next compute node to execute a compute function during execution of the low-level control graph; and executing the provisioned low-level control graph over time wherein, after a compute engine completes execution of a compute function of the set of compute functions, a job processing unit of the JPUs executes a control node of the low-level control graph to schedule a next compute node that represents a predefined compute function by dispatching the next compute node for execution on one of the compute engines, such that the compute nodes and the control nodes operate asynchronously as execution of the provisioned low-level control graph proceeds.

22. An artificial intelligence (AI) for decentralized scheduling of compute graphs on heterogenous platforms, comprising:

a processing circuitry; and a memory, the memory containing instructions that, when executed by the processing circuitry configure the processing circuitry to:

compile a source compute graph into a low-level control graph, wherein the source compute graph represents a set of compute functions to be performed on compute engines embedded in the heterogenous platform, and wherein the low-level control graph includes compute nodes and control nodes;

provision the low-level control graph for execution on compute engines and job processing units (JPUs), wherein the low-level control graph determines a schedule of execution of the set of compute functions, wherein a control node in the low-level control graph schedules a next compute node to execute a compute function during execution of the low-level control graph; and execute the provisioned low-level control graph over time wherein, after a compute engine completes execution of a compute function of the set of compute functions, a job processing unit of the JPUs executes a control node of the low-level control graph to schedule a next compute node that represents a predefined compute function by dispatching the next compute node for execution on one of the compute engines, such that the compute nodes and the control nodes operate asynchronously as execution of the provisioned low-level control graph proceeds.

* * * * *